(12) United States Patent
Fassone et al.

(10) Patent No.: US 11,825,391 B2
(45) Date of Patent: Nov. 21, 2023

(54) TRACKING DRUM ROTATIONS

(71) Applicant: Prysmian S.p.A., Milan (IT)

(72) Inventors: Davide Fassone, Milan (IT); Antonino Arena, Milan (IT)

(73) Assignee: Prysmian S.p.A., Milan (IT)

( * ) Notice: Subject to any disclaimer, the term of this patent is extended or adjusted under 35 U.S.C. 154(b) by 288 days.

(21) Appl. No.: 16/849,647

(22) Filed: Apr. 15, 2020

(65) Prior Publication Data

US 2020/0241037 A1  Jul. 30, 2020

Related U.S. Application Data

(63) Continuation-in-part of application No. 16/725,099, filed on Dec. 23, 2019, now Pat. No. 11,144,864.

(30) Foreign Application Priority Data

Dec. 28, 2018  (IT) .......................... 102018000021304

(51) Int. Cl.
    *G01P 15/14*  (2013.01)
    *G01P 15/18*  (2013.01)
    (Continued)

(52) U.S. Cl.
    CPC ............... *H04W 4/38* (2018.02); *G01P 15/14* (2013.01); *G01P 15/18* (2013.01); *G06F 16/901* (2019.01);
    (Continued)

(58) Field of Classification Search
    CPC .. B65H 16/00; B65H 16/028; B65H 23/1882; B65H 61/00; B65H 75/182;
    (Continued)

(56) References Cited

U.S. PATENT DOCUMENTS

| | | | |
|---|---|---|---|
| 8,886,980 B2 * | 11/2014 | Kulik .................. | G01C 21/165 713/323 |
| 2004/0196182 A1 * | 10/2004 | Unnold .............. | G08B 21/0269 342/357.25 |

(Continued)

FOREIGN PATENT DOCUMENTS

| | | |
|---|---|---|
| EP | 3136320 A1 | 3/2017 |
| WO | 9630721 A2 | 10/1996 |

OTHER PUBLICATIONS

Wikipedia, "Inclinometer," May 27, 2019, 6 pages.

*Primary Examiner* — Judy Nguyen
*Assistant Examiner* — Martin Walter Braunlich
(74) *Attorney, Agent, or Firm* — Slater Matsil, LLP

(57) ABSTRACT

A method of tracking rotations of a drum includes activating a three axis accelerometer located on a side of the drum, measuring linear accelerations along three orthogonal axes using the accelerometer, determining whether a predetermined angle of the drum has been rotated based on the measured linear accelerations from the accelerometer, activating a gyroscope when it is determined that the predetermined angle of the drum has been rotated, measuring angular speed at the gyroscope, calculating a number of rotations of the drum from the measured angular speed, and deactivating the gyroscope when it is determined that the measured angular speed is lower than a noise floor level.

20 Claims, 7 Drawing Sheets

(51) Int. Cl.
*G06F 16/901* (2019.01)
*G16Y 20/20* (2020.01)
*G16Y 10/30* (2020.01)
*G01C 19/00* (2013.01)
*H04W 4/38* (2018.01)
*H04W 4/029* (2018.01)
*H04W 4/80* (2018.01)

(52) U.S. Cl.
CPC .............. *G16Y 20/20* (2020.01); *H04W 4/029* (2018.02); *H04W 4/80* (2018.02); *B65H 2511/114* (2013.01); *G01C 19/00* (2013.01)

(58) Field of Classification Search
CPC .... B65H 2511/114; G01C 19/00; G01D 5/12; G01P 15/0891; G01P 15/14; G01P 15/18; G06F 16/901; G06Q 10/08; G06Q 10/087; G16Y 10/30; G16Y 20/20; H04W 4/02; H04W 4/029; H04W 4/38; H04W 4/80
See application file for complete search history.

(56) References Cited

U.S. PATENT DOCUMENTS

| | | |
|---|---|---|
| 2006/0202817 A1 | 9/2006 | Mackenize et al. |
| 2014/0349267 A1 | 11/2014 | Thornton |
| 2015/0142362 A1* | 5/2015 | Jordan ................ B28C 7/02 |
| | | 702/96 |
| 2016/0023863 A1* | 1/2016 | Martin ................ B65H 63/08 |
| | | 242/563.2 |
| 2017/0191822 A1 | 7/2017 | Becker et al. |
| 2018/0284758 A1* | 10/2018 | Cella ................ H04B 17/23 |

\* cited by examiner

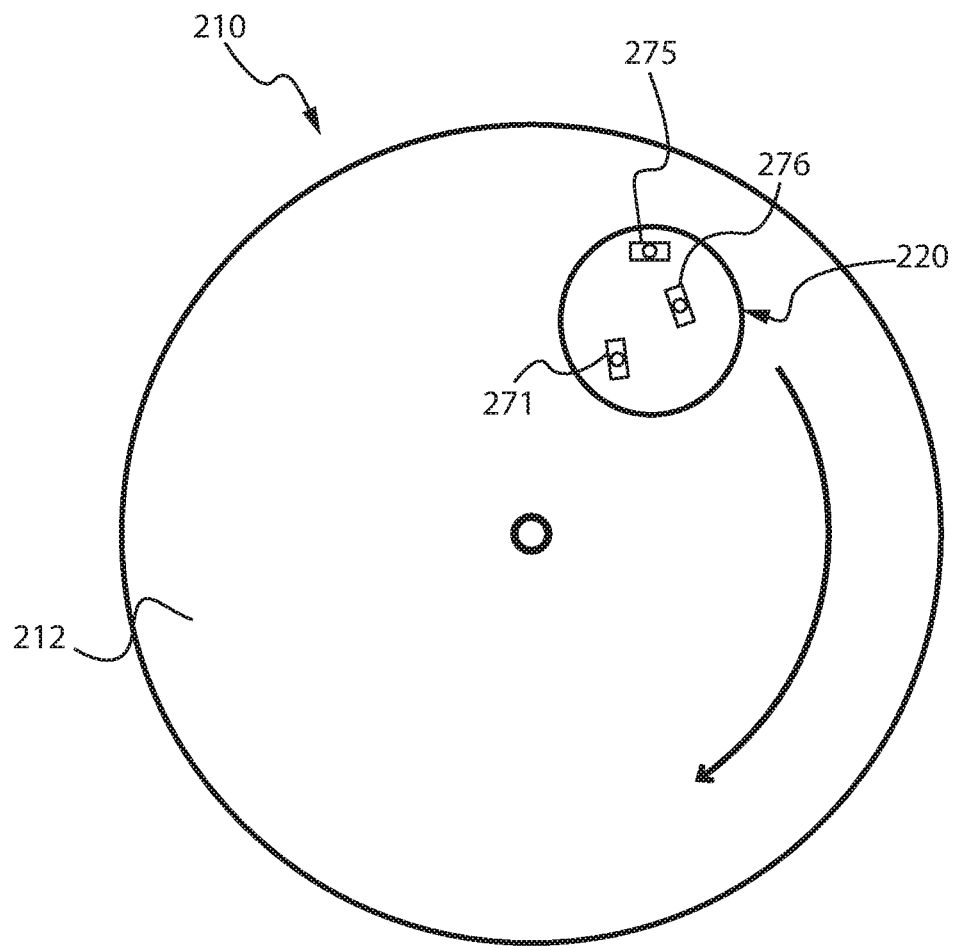

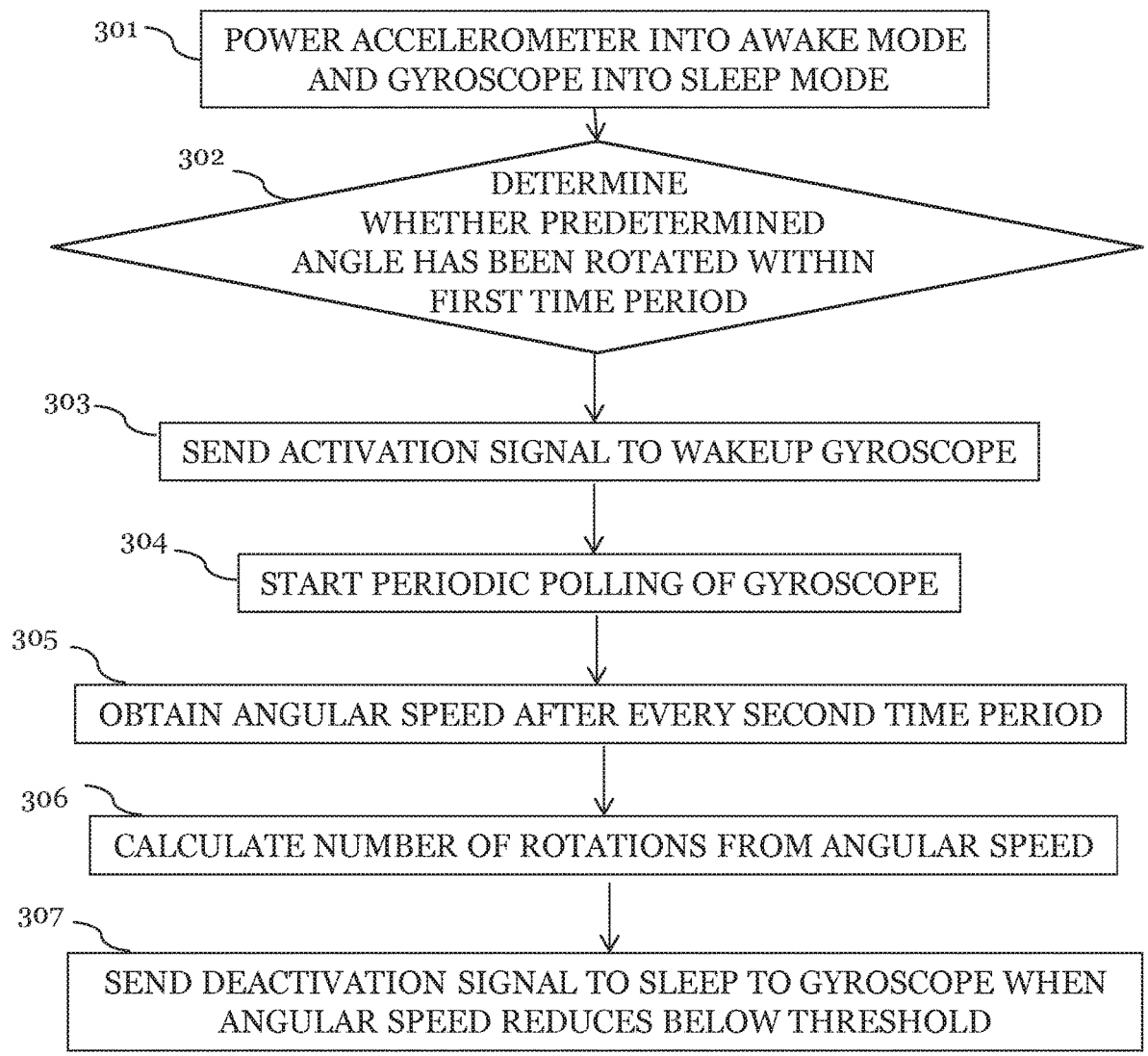

TRACKING DRUM ROTATIONS

CROSS-REFERENCE TO RELATED APPLICATIONS

This application is a continuation-in-part of U.S. patent application Ser. No. 16/725,099, filed on Dec. 23, 2019, which claims priority to Italian Patent Application No. 102018000021304, filed on Dec. 28, 2018, which applications are hereby incorporated herein by reference.

TECHNICAL FIELD

The present invention relates generally to drums, and in particular embodiments, to methods and systems for tracking drum rotations.

BACKGROUND

As it is known, drums with reels of cable of different types and of different lengths are typically stored concurrently in a large inventory storage area from which specific cable drums are selected and picked up on the basis of specific projects or construction to be performed.

Once the cable wound on a drum is used, which results in an empty drum, the empty drum is moved to a storage area which can be the initial inventory storage or a different storage area. The empty drum is then returned to the workhouse of the cable manufactory to be reused for winding a new cable.

Typically, once a customer makes an order for cable drums, he needs to trace in real-time the position of the cable drums throughout the shipping and delivery process in order to improve the project planning. These tracking data allow analyzing and comparing efficiencies between transporters based on actual delivery times.

Furthermore, more and more frequently, customers also request to receive updated information about the cable length on the drums in order to reduce the likelihood of running short on stock and to reduce the amount of time that empty drums are left on site waiting to be returned to the workhouse of the cable manufactory. This facilitates the management of the stock and allows improving of the pick-up planning for empty drums and the delivery of new orders, thus increasing the transport efficiency.

In order to improve the order planning and facilitating the stock management of products in the inventory storage, it is known to provide traceable cable drums having tracking means.

US2016/0023863 describes a system and method for tracking the remaining length of a material wound on a reel. In the system, two sensors deployed relative to the reel (and to each other) produce detection signals when a detection element mounted on the reel is near the respective sensor in an order indicative of forward or reverse reel rotation. The system further includes a processor operably receiving the detection signals to count a total number of forward rotations of the reel, which count is saved in memory. A battery powers the processor, memory, and sensors. The system further includes a transceiver that removably and operably couples between the memory and a calculator that calculates the remaining length of the material wound on the reel based on the total number of forward rotations of the reel. The system may also record the time and location associated with the rotations.

US2006/0202817 discloses that in GPS based and other types of asset tracking systems, event masking rules may be applied at asset tracking units and/or at a central station to determine whether to report events detected by the asset tracking units. The events may pertain to transportation vehicles such as truck trailers or cargo containers to which the asset tracking units are attached. The event masking rules may be defined at the central station and downloaded by satellite communication to the asset tracking units and/or the rules may be defined locally at the asset tracking units.

SUMMARY

According to a first aspect, the present disclosure relates to a method for tracking cable drums comprising the steps of: a) attaching a tracker device with a tracker identifier to a cable drum with a drum identifier, said drum identifier being associated in a database with drum dimensions and with cable dimensions of a cable stored on the drum; b) associating in the database the drum identifier also with the tracker identifier; c) when an event comprising at least a shock and/or a number of rotations of the drum around a longitudinal axis (Y) occurs, activating a first electronic circuit of the tracker device including a sensing device that detects at least the event, storing the detected event in a local memory of the tracker device and switching the first electronic circuit to standby mode after the detected event is stored; d) activating a second electronic circuit including a communication circuit that connects to a communication system and a positioning circuit that detects the position coordinates of the tracker device and the cable drum, transmitting via the communication system the tracker identifier, the detected position coordinates and the detected events stored in the local memory; e) associating the transmitted detected position coordinates and the transmitted detected events to the tracker identifier and the drum identifier in the database; and f) calculating using the data stored in the database the remaining length of the cable on the cable drum, where the activating of the second electronic circuit and the subsequent steps occur at scheduled time intervals and where after the transmitting step the second electronic circuit is switched to standby mode.

In an embodiment, after the successful transmitting step at point d) at least part of the local memory is cleaned.

In this way, the managing of the available space of the local memory is optimized.

In an embodiment, the positioning circuit is configured to detect the position coordinates of the tracker device and the cable drum by means of a satellite positioning circuit or by means of data retrieved from the communication system by the communication circuit.

In this way, a redundancy for the localization of the cable drum is created; this improves the reliability of the tracking of the cable drum.

Through retrieved data, either from the satellite positioning circuit as well as from the communication circuit, the system checks and ensures that transmission datetime retrieved from the network is correct by comparing provided datetime to the UTC datetime of a given location.

In an embodiment, the method comprises before the second electronic circuit is switched to standby mode the following steps: checking whether new configuration data are available in the database and in case of a positive outcome of this verification downloading said new configuration data and applying said new configuration to the tracker device electronic circuits. This allows to upgrade the electronic circuit of the tracker device, or to configure it based on certain customer demands.

In an embodiment, the sensing device detects also at least one environmental parameter.

The detection of the environmental parameters can be used for developing predictive analysis of the cable drum general conditions in order to determine its suitability for recovery, reconditioning and/or disposal.

In an embodiment, the activating of the second electronic circuit and the subsequent steps additionally occur when the tracker device has been attached to the flange of the cable drum.

In an embodiment, the activating of the second electronic circuit and the subsequent steps additionally occur when a control signal is received by the communication circuit.

This control signal can be a request of synchronization signal.

In this way, it is possible to receive the detected information about the cable drum and the cable length at any desired time.

In an embodiment, the activating of the second electronic circuit and the subsequent steps occur when a control signal is received by a near-field communication (NFC) switch device associated to the tracker device and configured for activating/deactivating the tracker device.

In an embodiment, the sensing device is configured to detect shocks above a predetermined threshold force value.

This implies the saving of the space of the local memory and of the battery charge of the tracking device.

In an embodiment, the sensing device comprises: at least two mechanical tilt switches positioned parallel to and off-centered to a flange of the cable drum so that they sequentially assume the open position and the close position when the cable drum rotates around a longitudinal axis defining a sequence of change of state of the at least two mechanical tilt switches that corresponds to a complete rotation of the cable drum; one or more shock sensors configured for detecting shocks of the cable drum; the detection of the number of rotations of the cable drum around its longitudinal axis (Y) comprising the following steps: detecting the change of state of the mechanical tilt switches; counting the number of rotations of the cable drum by counting the occurrence of the sequence of change of state of the at least two mechanical tilt switches that corresponds to a complete rotation of the cable drum.

This counting is very reliable since it is based on the detection of a predetermined sequence of events involving two or more sensors, i.e. the at least two mechanical switches. Then, also the tracking of the cable length is very reliable.

In an embodiment, the one or more shock sensors are also configured for verifying whether the cable drum is rotating around its longitudinal axis (Y) and the step of counting the number of rotations of the cable drum starts if the one or more shock sensors verify that the cable drum is rotating around its longitudinal axis (Y).

In an embodiment, the step of counting the number of rotations of the cable drum starts if the one or more shock sensors detect a substantially constant rotation of the cable drum around its longitudinal axis (Y) at a rotation speed higher than a minimum value.

In an embodiment, the method for counting the rotations of a cable drum comprises the step of correcting with a gyroscope the number of counted rotations when the cable drum is rotating at a rotation speed above a maximum value, or when the cable drum is rotating around a longitudinal axis not parallel to the earth plane. This prevents a possible false counting of the number of rotations due to blocking of the mechanical tilt switches occurring due to centrifugal force when the cable drum is rotating at high speed, or occurring when the cable drum is rotating under an angle. Depending on the size of the cable drum and the distance of the tilt switches to the longitudinal axis of the cable drum the blocking of the tilt switches may occur at a rotation speed higher than a revolution per 500 ms.

In an embodiment, the tracker device comprises a main processing and control unit that has an internal clock which performs a countdown of given time corresponding to the scheduled time interval and the method for counting the rotations of a cable drum provides a step wherein the event detected by the sensing device is stored in the local memory with the countdown value corresponding to the time of the activation of said first electronic circuit.

In another aspect, embodiments of the present disclosure relate to a system for tracking cable drums configured for implementing the above method comprising: a cable drum; a tracker device attached to the cable drum; a database capable of communicating with the tracker device through a communication system; and a central processing unit associated to the database.

BRIEF DESCRIPTION OF THE DRAWINGS

Further characteristics will be apparent from the detailed description given hereinafter with reference to the accompanying drawings, in which:

FIG. 6 is a plan view of a flange of a cable drum with the tracker device according to the embodiment of FIG. 5; and FIG. 7 illustrates a method of operation of a tracker device for calculating a rotation rate of a drum in accordance with an embodiment of the present invention.

DETAILED DESCRIPTION OF ILLUSTRATIVE EMBODIMENTS

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the disclosure. This is done merely for convenience and to give a general sense of the disclosure. This description should be read to include one or at least one, and the singular also includes the plural unless it is obvious that it is meant otherwise.

Applicant has observed that the tracking system for cable drums preferably is able to track the position of and the remaining cable length on the drum.

In particular, Applicant has observed that the remote tracker devices that are attached to the cable drums and that must be powered with electric energy for collecting and transmitting data preferably have a minimal autonomy of 24 months.

Therefore, the electronic circuit of such remote tracker devices intended to communicate the tracking data cannot be activated all the time, but at the same time the events affecting cable length or drum integrity must be recorded.

Applicant has faced the problem of reducing the energy consumption of the remote tracker devices in order to obtain the minimal autonomy of 24 months assuring the recording of the events related to the cable drum and to the cable length.

Applicant has realized that if the transmission of the tracking data is not performed in real-time and then if it intermittent occurs at predefined times, the electronic circuit intended to communicate the tracking data does not need to be continuously powered on, but it can be activated at said predefined times involving energy consumption reduction.

Applicant, then, has thought to save in a local memory of the tracking device detected events related to the cable drum and to the cable length once they have been detected, so that the transmission of this saved data can occur at any predefined time.

This involves a reduction of the energy consumption of the electronic circuit of the tracker device.

Moreover, Applicant has thought also to switch such an electronic circuit to a standby mode after the transmission of the detected saved data has been performed.

This allows a further saving of the battery charge of the tracker device.

Figure 1:
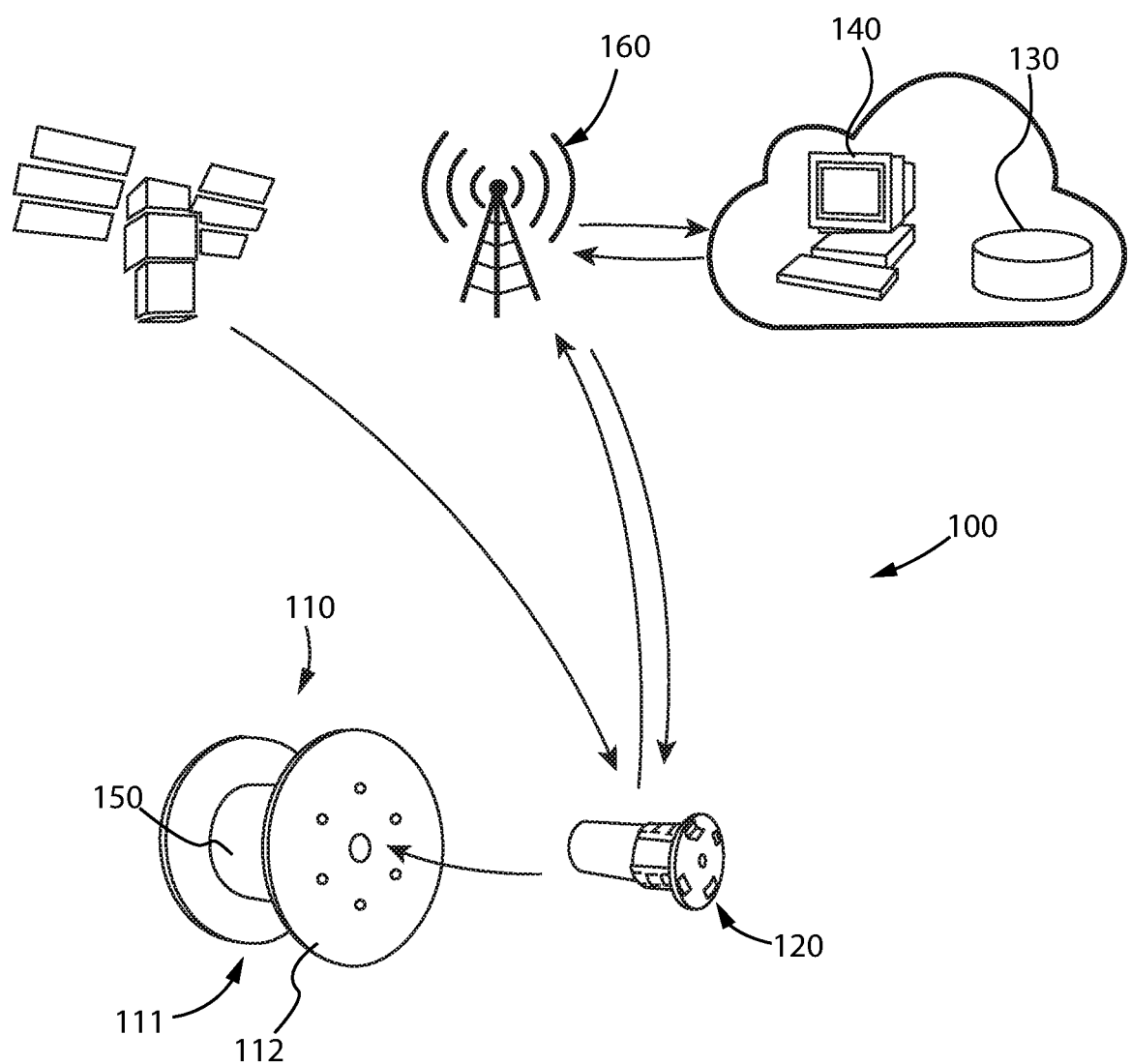
FIG. 1 is a schematic view of a tracking system according to embodiments of the present disclosure.

A system 100 for tracking cable drums according to the present disclosure is shown in FIG. 1.

The system 100 for tracking cable drums comprises a cable drum 110, a tracker device 120 attached to the cable drum 110, a database 130 capable of communicating with the tracker device 120 and a computing device comprising a processor 140 associated with the database 130.

The cable drum no can be made of various materials, such as wood, metal or polymeric material. The cable drum no comprises a reel region 111 which, optionally, presents a cylindrical shape. The reel region 111 is configured for supporting a wound cable 150 of predetermined length. The cable 150 can be, for example, a telecommunication cable, an energy cable or a hybrid cable.

The cable drum no has a longitudinal axis Y and comprises two opposed flange regions 112 placed at opposite ends of the reel region 111. The flange regions 112 delimit a storage space for the wound cable 150. One of the flange regions 112 has a housing optionally presenting a cylindrical shape; this housing, in particular, is adapted to receive the tracker device 120. The housing can be provided on the flange region 112 after the cable drum no is assembled or during the manufacturing of the cable drum 110. As an example, in case the cable drum 110 is made of wood, the housing can be obtained by drilling the flange region 112.

The cable drum 110 is associated with a drum identifier that can be stored in a barcode/QRcode label or in a RFID/NFC tag attached to the cable drum 110.

The drum identifier is stored also in the database 130 associated with the drum dimensions and dimensions of the cable stored in the cable drum. So no information about dimensions, of the cable or the drum, is directly stored within the tag or label attached to the cable drum 110, thus avoiding any information leaks in case of tampering.

The tracker device 120 is associated with a tracker identifier that can be stored in a barcode/QRcode label or in a RFID/NFC tag attached to the tracking device 120.

Figure 2:
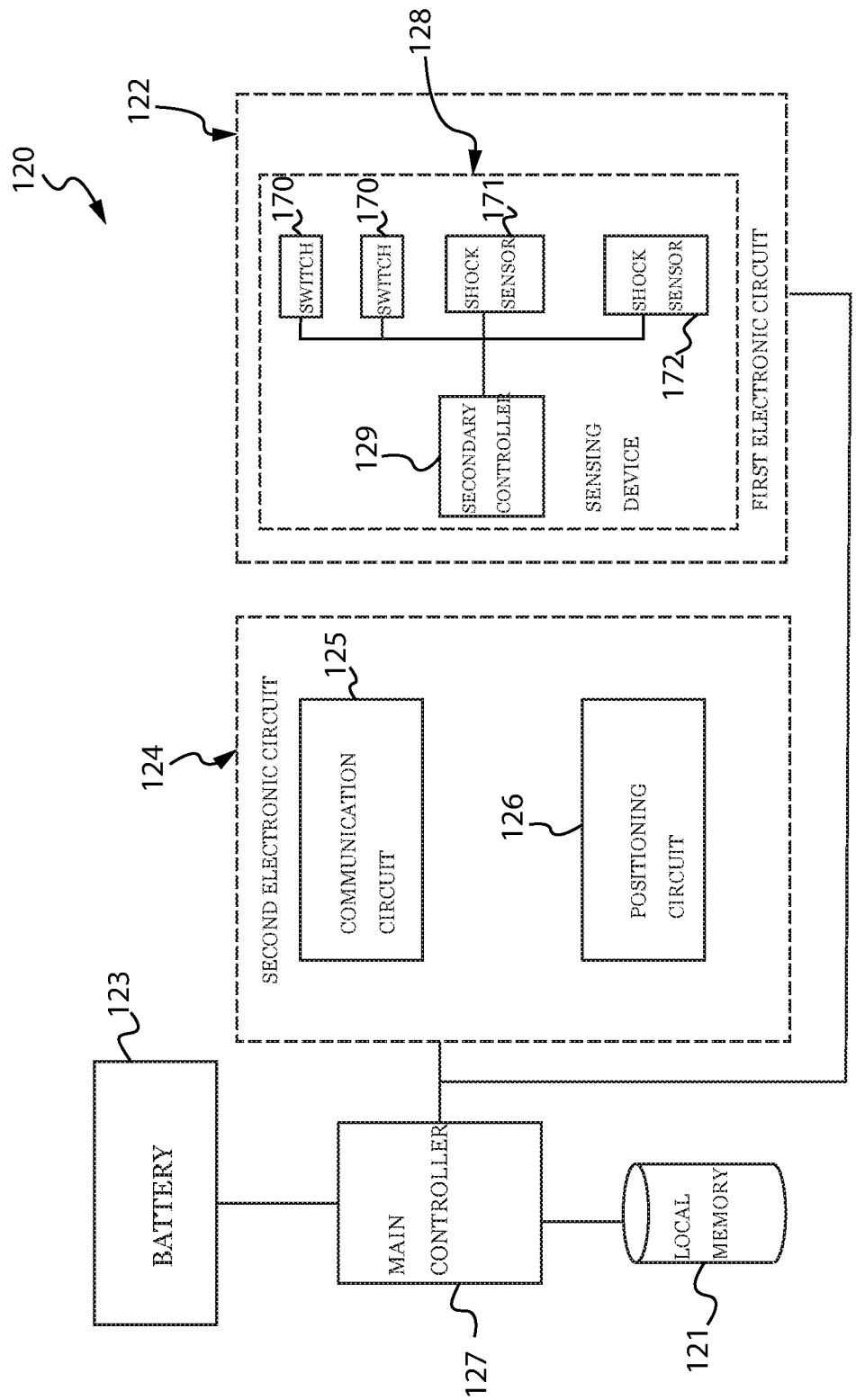
FIG. 2 is a block-diagram representing the electronic circuits of a tracker device of the tracking system of FIG. 1.

As illustrated in FIG. 2, the tracker device 120 comprises: a local memory 121; a first electronic circuit 122 including a sensing device 128 capable of detecting at least a shock and a number of rotations of the cable drum no around its longitudinal axis Y; a second electronic circuit 124 including a communication circuit 125 capable of wirelessly connecting to a communication system 160 and a positioning circuit 126 capable of detecting the position coordinates of the tracker device 120 and then of the cable drum 110.

The tracker device 120 is preferably energized by a suitable battery 123. The tracker device 120 optionally comprises also a solar panel associated to the battery in order to increase the battery efficiency and the consequent reduction in size of such a battery.

In particular, as it is shown in FIG. 2, the tracker device 120 comprises a main controller 127 configured for controlling all the electronic circuits and components of the tracker device 120.

The sensing device 128 comprises: at least two mechanical tilt switches 170 associated with one of the two flanges 112 of the cable drum no so that they are integral with the flange 112; in particular, the at least two mechanical tilt switches 170 are positioned parallel to and off-centered with respect to the flange 112 of the cable drum 110 so that they sequentially assume the open position and the close position when the cable drum 110 rotates around a longitudinal axis defining a sequence of change of state of the at least two mechanical tilt switches 170 that corresponds to a complete rotation of the cable drum 110; one or more shock sensors 171, 172 configured for detecting shocks of the cable drum; and a secondary controller 129 associated with the mechanical tilt switches 170 and with the shock sensors 171, 172. The secondary controller 129 is configured for detecting the change of state of the mechanical tilt switches 170 and for counting the number of rotations of the cable drum 110. The counting of the number of rotations of the cable drum is performed by counting the occurrence of the sequence of change of state of the at least two mechanical tilt switches 170 that corresponds to a complete rotation of the cable drum 110.

The mechanical tilt switches 170 assure that the sequence of openings and closings of the tilt switches occur in the right order within appropriate timings if the rotation speed is comprised between a minimum value and a maximum value. The minimum value of the rotation speed for example can be a revolution per 30 s. The maximum value of the rotation speed for example can be a revolution per 500 ms. If the mechanical tilt switches 170 detect a complete rotation within 500 milliseconds, this movement is interpreted as a vibration instead of a revolution. By using more mechanical tilt switches 170 it is possible to increase accuracy to the detriment of energy consumption.

Optionally, the two mechanical tilt switches 170 are positioned with an angle greater than 90° to each other.

Figure 3:
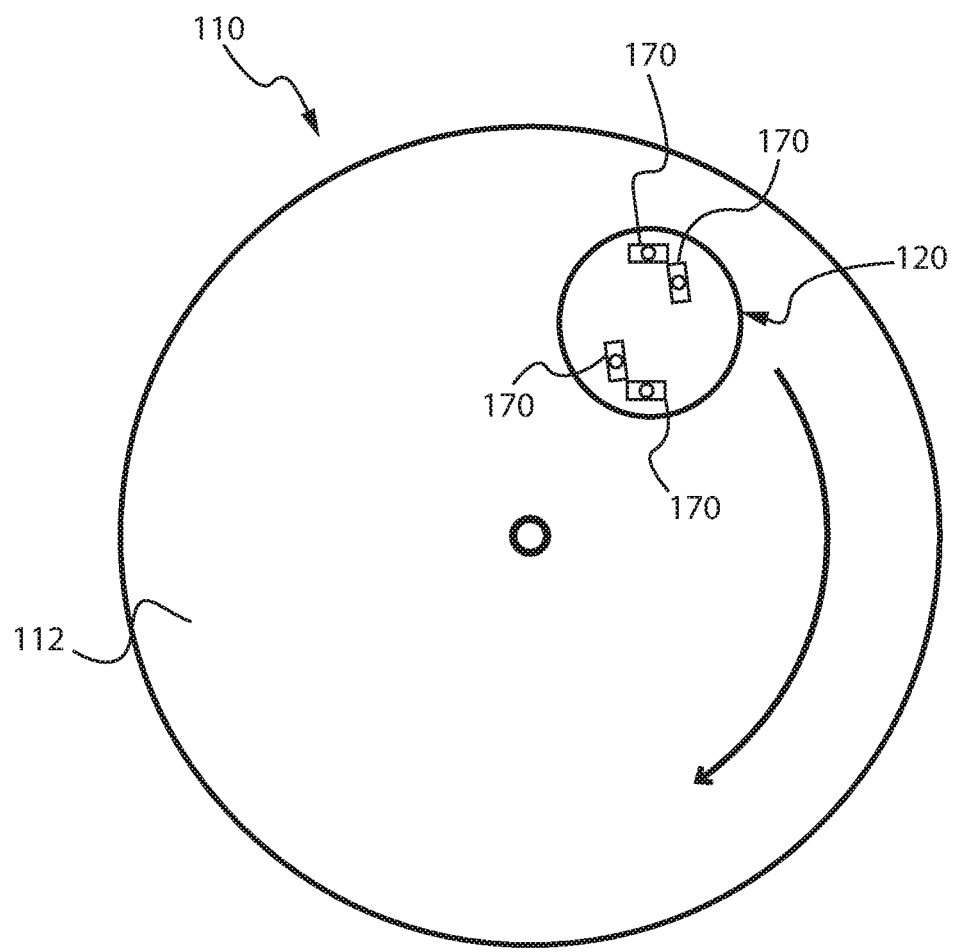
FIG. 3 is a plan view of a flange of a cable drum with a tracker device provided with mechanical tilt switches.

In the particular embodiment illustrated in FIG. 3, the sensing device 128 of the tracker device 120 comprises two pairs of the mechanical tilt switches 170 associated with the flange 112 of the cable drum no and the pairs are positioned about 180° relative to each other; in this case the mechanical tilt switches 170 of each pair are positioned at an angle greater than 90° relative to each other.

Alternatively, the sensing device 128 may comprise three mechanical tilt switches 170 associated with the flange 112 of the cable drum 110; in this case the mechanical tilt switches 170 are positioned at an angle of about 60° relative to each other.

The mechanical tilt switches 170 are, for example, rolling ball switches installed on a Printed Circuit Board (PCB) that is associated with the flange 112 so that the PCB containing the mechanical tilt switches 170 is parallel to the flange 112.

The one or more shock sensors 171, 172 can be configured for verifying whether the cable drum no is rotating around its longitudinal axis (Y). In this case, the counting of the number of rotations of the cable drum 110 starts if the one or more shock sensors 171, 172 verify that the cable drum no is rotating around its longitudinal axis (Y).

The shock sensors 171, 172 can comprise a gyroscope, or a biaxial/triaxial accelerometer and a gyroscope, or a couple of biaxial/triaxial accelerometers.

In this description, the biaxial accelerometer may be an accelerometer capable of detecting displacements along the two axes orthogonal to the longitudinal axis Y.

As it is known a biaxial accelerometer can be replaced by a pair of uniaxial accelerometers, as well as a triaxial accelerometer can be replaced by three uniaxial accelerometers. Moreover, a gyroscope can be replaced by two biaxial/triaxial accelerometers.

In light of the presence of at least a gyroscope or of a couple of biaxial/triaxial accelerometers, the shock sensors 171, 172 are then capable of verifying whether the cable drum 110 is effectively rotating around its longitudinal axis and is not translating, so as to allow to discriminate false positives on rotations counts. The combined use of mechanical tilt switches 170 and of a gyroscope or of a couple of biaxial/triaxial accelerometers provides the capability to count effective spins around the longitudinal axis (Y). Moreover, the shock sensors 171, 172 can be also capable of detecting the rotation speed of the cable drum 110. The combination of the detection of the number of rotations and the speed of the rotation can provide information about potential harms to the cable 150 in case it is tugged with excessive force.

In this case, the secondary controller 129 is configured for verifying whether the cable drum 110 rotates constantly around its longitudinal axis Y at a rotation speed higher than a minimum value, for example one revolution every 30 seconds. In case of a positive outcome of this verification the secondary controller 129 exploits the counting of the number of rotations of the cable drum 110 around its longitudinal axis.

In this way, it is possible to avoid the counting of the number of rotations in the situations that are far from regular operation conditions, thus saving electrical power.

If the cable drum 110 is not rotating constantly it more likely means that it is being pulled, pushed, or loaded to or from transportation equipment, and this scenario is far from regular operations. The sensing device 128 optionally is configured to detect also environmental parameters like, for example, temperature, humidity, and atmospheric pressure; in this case the sensing device 128 comprises also a temperature sensor and/or a humidity sensor and/or a barometer for measuring the atmospheric pressure.

The communication circuit 125 comprises wireless transceivers adapted to transmit data signals on a wireless communication system, like for example a GSM/GPRS network or a Narrowband network or a Bluetooth link.

The positioning circuit 126 comprises a satellite positioning circuit such as GPS, Glonass, Beidou or Galileo adapted for receiving position coordinates at scheduled times optionally controlled by the main controller 127.

Optionally, the tracker device 120 comprises a sensor adapted to activate the tracker device 120 when it is attached to the cable drum 110. This sensor can be a magnetic switch adapted to activate the tracker device 120 when it is aligned with magnets positioned on the cable drum 110 at the correct mounting position of the tracker device 120.

Alternatively, this sensor can be a near-field communication (NFC) switch device associated with the tracker device 120 and configured for activating/deactivating the tracker device 120 when it receives a control signal. This control signal can be sent by a terminal, like for example a smartphone.

The database 130 can be a cloud memory with which it is possible to communicate in a wireless manner.

To ensure sufficient strength and durability, the circuits of the tracker device 120 are sprayed with a special resin that does not interfere with the electronic operation of the circuits and does not induce any magnetic field for the operation of radio transmissions.

The positioning circuit 126, in particular, is configured to detect the position coordinates of the tracker device 120 and of the cable drum 110 by means of a satellite positioning circuit such as GPS, Glonass, Beidou or Galileo or by means of data retrieved by the communication circuit 125 from the communication system 160 or other networks like for example a Low Earth Orbit network.

In the absence of a satellite signal, the position coordinates may be obtained through the GSM module by triangulating or trilaterating calculations performed by the processor 140.

If it is not possible to determine the position of the tracker device 120, the processor 140 can indicate the partial reliability of the received data.

After that, the tracker identifier, the detected position coordinates and the detected events stored in the local memory 121 are transmitted to the database 130 via the communication system 160. The transmission is exploited through the communication circuit 125.

Optionally, after the transmission at least part of the local memory 121 is cleaned. In particular, all previous stored information except the last one and the data just sent are removed.

In any case, the activating of the second electronic circuit 124 and the subsequent steps occur at pre-set intervals controlled by the main controller 127.

Optionally, the activating of the second electronic circuit 124 and the subsequent steps occur when the tracker device 120 has been attached to the cable drum 110; this may be obtained by providing the tracker device 120 with the magnetic switch or with the near-field communication (NFC) switch device previously described.

According to another further option, the activating of the second electronic circuit 124 and the subsequent steps occur when a request of synchronization signal is received by the communication circuit 125.

In this case, the request of synchronization signal may be sent by the processor 140 following a command of a user. In this way, it is possible to retrieve data at any time.

After the transmitting step the second electronic circuit 124 is switched to standby mode by the main controller 127. The switching to standby mode after the transmission occurs regardless of the output of the transmission, which guarantees preventive battery degradation and offers the opportunity to develop a database side alert logic.

The main controller 127 can have an internal clock which performs a countdown of given time corresponding to the scheduled time interval.

In this case, when the first electronic circuit 122 of the tracker device 120 is activated, the event detected by the sensing device 128 is stored in the local memory 121 with the countdown value corresponding to the time of the activation of said first electronic circuit 122. In this way, it is possible to calculate the time at which each stored event occurred.

Optionally, before the second electronic circuit 124 is switched to standby mode the method for tracking cable drums according to embodiments of the present disclosure provides the steps of checking whether new configuration data are available in the database. In case of a positive outcome of this verification, the method provides for downloading the new configuration data and applying the new configuration to the tracker device electronic circuits.

In fact, the communications between the tracker device and the database can be bidirectional so it is possible to manage and adjust the tracker device settings (firmware, frequency, schedule of the transmission and so on).

The transmitted data are then associated to the tracker identifier and the drum identifier in the database 130.

Then, the processor 140 calculates using the data stored in the database 130 the remaining length of the cable 150 on the cable drum 110.

In particular, the data detected from the sensing device 128 are required to calculate the amount of cable 150 still present on the cable drum 110. This processing requires also that the drum dimensions (core diameter, inner drum width) and cable dimensions (diameter, length) are known.

The calculated remaining length of the cable 150 can then be stored in the database 130 associated with the tracker identifier and the drum identifier.

The system and the method for tracking cable drum according to embodiments of the present disclosure have many advantages.

The database 130 and the processor 140 can be part of a Web portal or Web Platform capable of collecting and processing all the information found on the territory ensuring sufficient flexibility in terms of evolution and delivery of the service. In this case, the processor 140 can be provided with a software capable of: searching and locating a single cable drum through geographic view; defining alarms based on the position of the cable drum in relation to defined geographic areas (Geofencing) and/or based on the time in a specific location, especially in a configuration where the transmission frequency is increased; providing historical traceability of each cable drum and/or about cable amount based on detected positions; generating a report for cable drums flows and stocks in the territory; integrating with external services (i.e. Shipping Providers).

By managing location information and geofencing areas such as production plant and delivery address, the Web Platform can be configured to notify either through SMS or e-mail the configured distribution list for a given order (the order, drum, customer and all related information are associated to the tracker during the association phase) about the drum's status changes: Preparing, Ready, Shipping, Delivered.

The Web Platform has the dual function to collect data from each deployed tracker device 120 and managing their settings from remote.

In fact, the Web Platform can send remote commands and even reprogram the tracker devices 120 firmware remotely.

The Web Platform can also be configured to aggregate data from the field (from the trackers) with data coming from production systems such as MES, SAP, etc. through API, EDI or similar integration.

Figure 4:
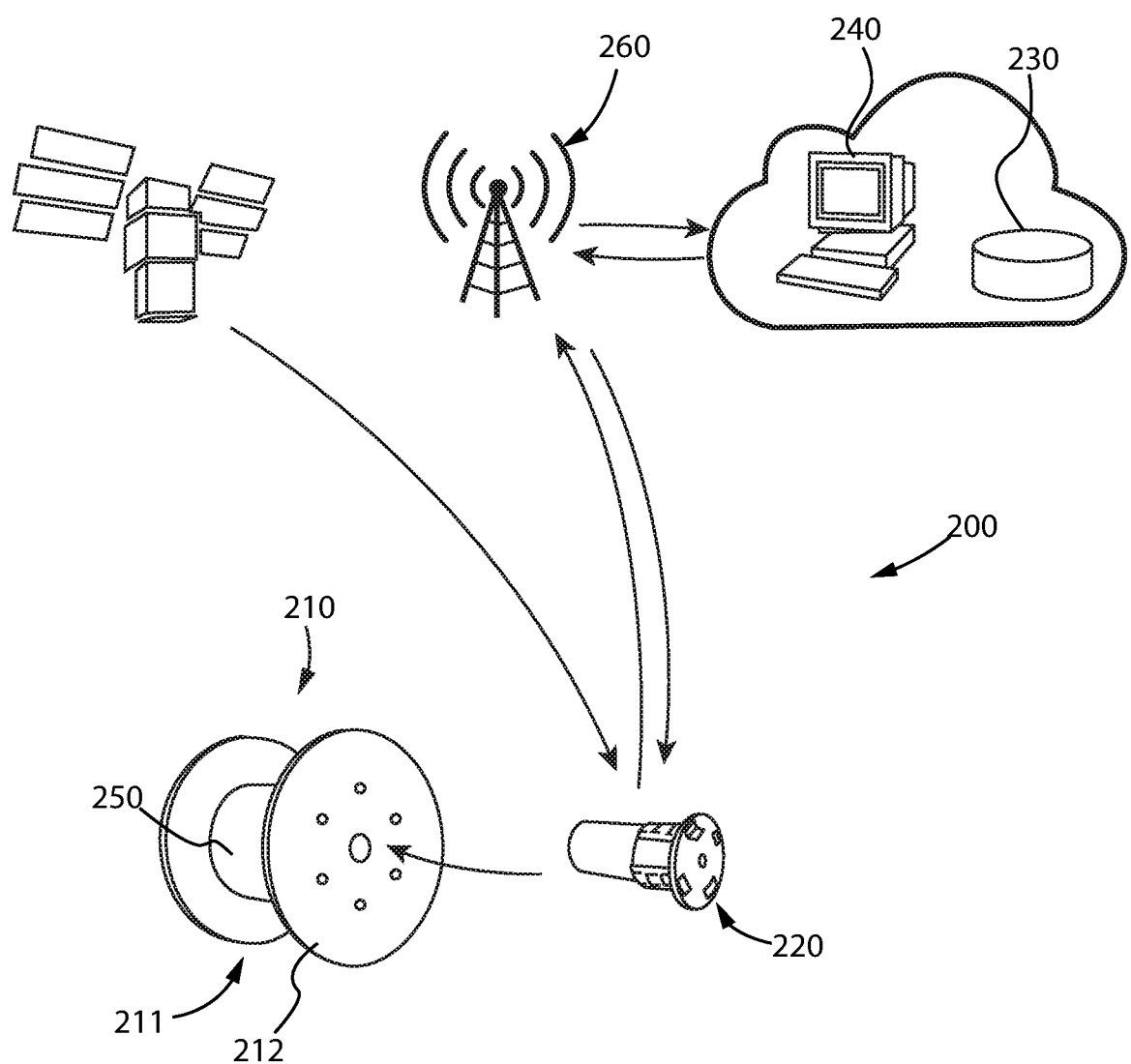
FIG. 4 is a schematic view of a tracking system according to embodiments of the present disclosure.
Figure 5:
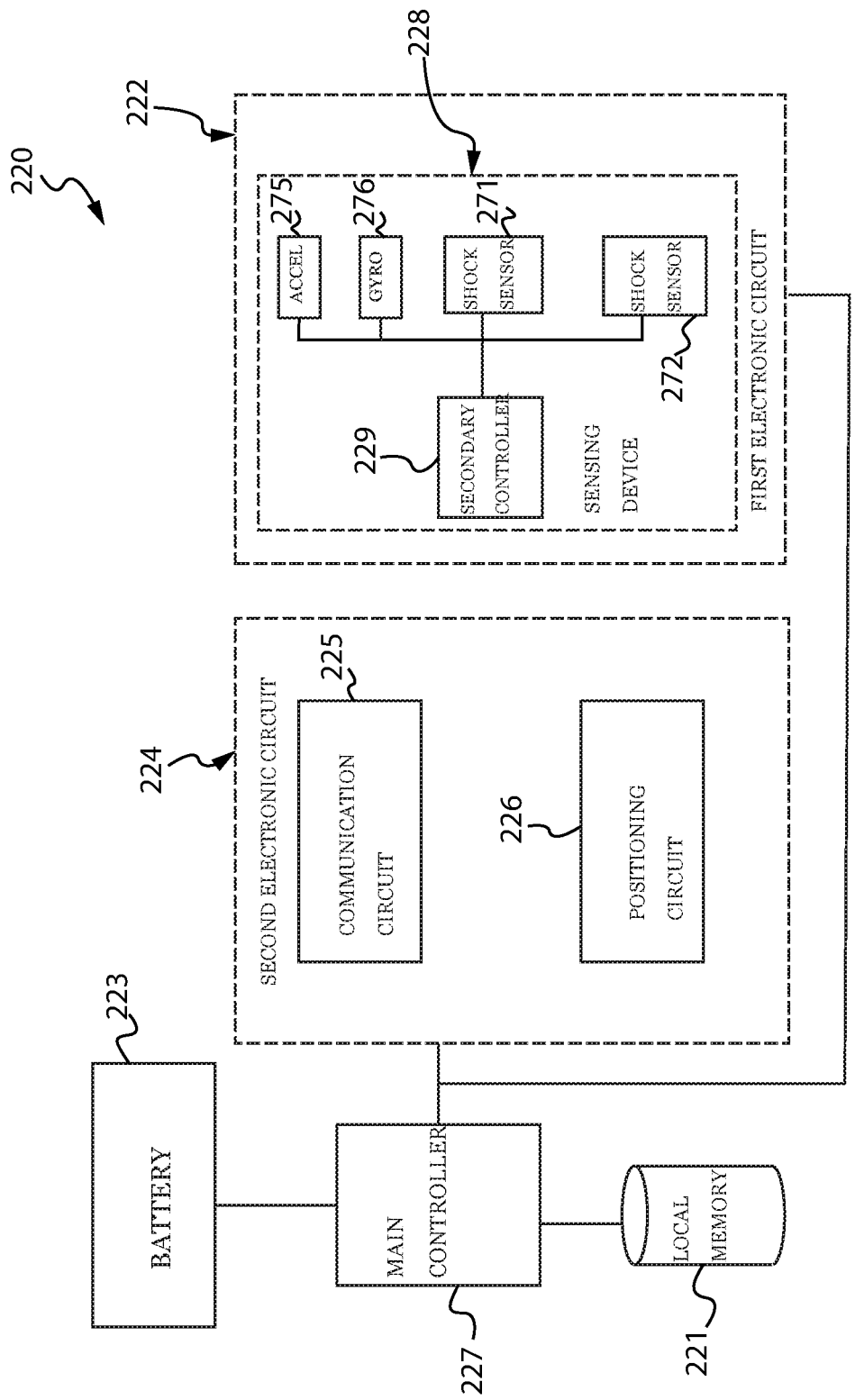
FIG. 5 is a block-diagram representing the electronic circuits of a tracker device of the tracking system of FIG. 4.

FIGS. 4-6 illustrate another embodiment of a system for tracking drums or reels. A system 200 for tracking drums or reels according to embodiments of the present disclosure is shown in FIG. 4.

The system 200 for tracking drums or reels comprises a drum 210 (or reel), a tracker device 220 attached to the drum 210, a database 230 capable of communicating with the tracker device 220 and a computing device comprising a processor 240 associated with the database 230.

The drum 210 can be made of various materials, such as wood, metal or polymeric material. The drum 210 may comprise a reel region 211 which, optionally, presents a cylindrical shape. The reel region 211 is configured for supporting a wound material 250 of predetermined length. The material 250 can be, for example, a cable, such as a telecommunication cable, an energy cable or a hybrid cable, a film, a paper tape, a wire, or the like.

The drum 210 has a longitudinal axis Y and may comprise two opposed flange regions 212 placed at opposite ends of the reel region 211. The flange regions 212 delimit a storage space for the wound material 250. One of the flange regions 212 has a housing optionally presenting a cylindrical shape. This housing may be adapted to receive the tracker device 220. The housing can be provided on the flange region 212 after the drum 210 is assembled or during the manufacturing of the drum 210. As an example, in case the drum 210 is made of wood, the housing can be obtained by drilling the flange region 212.

The drum 110 is associated with a drum identifier that can be stored in a barcode/QRcode label or in a RFID/NFC tag attached to the drum 210.

The drum identifier is stored also in the database 230 associated with the drum dimensions and dimensions of the material stored on the drum 210. In an embodiment, no information about dimensions, of the material or the drum, is directly stored within the tag or label attached to the drum 210, thus avoiding any information leaks in case of tampering.

The tracker device 220 is associated with a tracker identifier that can be stored in a barcode/QRcode label or in a RFID/NFC tag attached to the tracking device 220.

As shown in FIG. 4, the tracker device 220 includes a local memory 221, a first electronic circuit 222 including a sensing device 228 capable of detecting at least a shock and a number of rotations of the drum 210 around its longitudinal axis Y, a second electronic circuit 224 including a communication circuit 225 capable of wirelessly connecting to a communication system 260 (see FIG. 4) and a positioning circuit 226 capable of detecting the position coordinates of the tracker device 220 and thus of the drum 210.

The tracker device 220 is preferably energized by a suitable battery 223. The tracker device 220 optionally comprises also a solar panel associated to the battery in order to increase the battery efficiency and the consequent reduction in size of such a battery.

In particular, as it is shown in FIG. 4, the tracker device 220 comprises a main controller 227 configured for controlling all the electronic circuits and components of the tracker device 220.

The sensing device 228 includes one or more accelerometers 275 and one or more gyroscopes 276. The accelerometers 275 and gyroscopes 276 may be associated with one of the two flanges 212 of the drum 210 so that they are integral with the flange 212. For example, the accelerometers 275 may include separate uniaxial accelerators for measuring the instantaneous acceleration in three orthogonal axes. Alternately, the accelerators 275 may be biaxial or triaxial accelerometers. Similarly, the gyroscope 276 may include a uniaxial gyroscope for measuring instantaneous angular velocity around the main axis of the drum 210. Alternately, the gyroscope 276 may be a biaxial or a triaxial gyroscope. Using the measured accelerations and angular velocity from the accelerometers 275 and the gyroscopes 276, the rate of rotations of the drum 210 may be counted at the secondary controller 229.

In an embodiment, an accelerometer 275 and a gyroscope 276 are provided in the sensing device 228. The accelerometer 275 and the gyroscope 276 may be physically contained within the same electronic component or they may be provided in separate components.

FIG. 7 illustrates a method of operation of the tracker device 220 for calculating the rotation rate of the drum 210 in accordance with an embodiment of the present invention.

As the accelerometer 275 consumes less power than the gyroscope 276, which is typical for accelerators and gyroscopes, embodiments of this disclosure enable the accelerometer and use the gyroscope only when angular information is to be measured. Accordingly, as illustrated in block 301, the accelerometer 275 is functional (powered to operate) at all times while the gyroscope 276 is in sleep mode unless activated.

In various embodiments, the accelerometer 275 is configured to sense a change in linear acceleration because of the rotation of the drum 210. Based on the change in linear acceleration in three orthogonal axes, information of rotation of the drum 210 around the main axis can be identified.

Referring next to block 302, the accelerometer 275 provides the sensed data to the second controller 229. The secondary controller 229 calculates the angle of rotation of the drum 210 around the main axis from the at least three linear accelerations. If the computed angle of rotation exceeds a predetermined angle threshold, such as 80 degrees, the second controller 229 determines that the drum 210 has begun to spin around its main axis.

Accordingly, as illustrated in block 303, the second controller 229 sends an activation signal to the gyroscope 276 to wakeup the gyroscope 276.

In some embodiments, the accelerometer 275 may have front-end circuitry that performs some initial calculation. In such embodiments, the accelerometer 275 generates an interrupt signal to the secondary controller 229 when a rotation of a predetermined angle is reached within a predetermined time threshold. For example, the accelerometer 275 sends a first interrupt signal to the secondary controller 229 when a rotation of 80 degrees is reached within three seconds. Upon receiving the first interrupt, the second controller 229 sends an activation signal to the gyroscope 276.

The counting of the number of rotations of the drum 210 is performed by the secondary controller 229 that corresponds to a complete rotation of the drum 210. The accelerometer 275 activates the counting system by generating and sending an interrupt signal to the secondary controller 229 when a predetermined angle (e.g., 80 degrees) is reached within a predetermined time threshold (e.g., 3 seconds). Such interrupt signal causes the secondary controller 229 to activate the gyroscope 276 and start repeated polling of measured data from the gyroscope 276 every predetermined time period (e.g., every 10 ms).

Once the interrupt signal is received by the secondary controller 229, the secondary controller 229 starts gathering or polling the gyroscope 276 for measured data (block 304). This polling of the measured data may be based on a schedule or periodic.

Accordingly, as illustrated by block 305, the secondary controller 229 periodically obtains the measured data and updates the angular speed around the main axis of the drum 210 within a second time period. This second time period may be set during the initial calibration of the drum 210 or at a factory. For example, the predetermined time may be 10 ms. In some embodiments, the second time period may be the same as the time interval between adjacent polling of measured data.

From the angular speed, as illustrated in block 306, the secondary controller 229 calculates the degree of rotation and/or the number of rotations during this second time period. In addition, a cumulative number of rotations can be calculated followed by the average rotation rate. Because of the accurate calculation of the angular speed, the cumulative number of rotations of the drum 210 is advantageously more accurately calculated than using other techniques. Using this information, advantageously, the amount of the material 250 (tape, cable, etc.) can be calculated in real time.

In addition, according to the shape with which the sinusoids develop on the gyroscope 276 axes, the direction of rotation (clockwise or counterclockwise) may be determined in various embodiments.

As next illustrated in block 307, once the drum 210 is determined to have stopped rotating, the secondary controller 229 sends a deactivation signal to the gyroscope 276 so as to put the gyroscope 276 back into a sleep mode. As the drum 210 begins to slow down, the instantaneous angular speed being computed follows a decreasing trend. Once the angular speed drops below a noise floor level, the drum 210 is considered to have stopped rotating.

Therefore, the secondary controller 229 increments the total speed until it reaches its lower limit to avoid electronic noise. In an embodiment, this lower limit is set to $0.002\omega$.

Though a specific angle of 80 degrees within a time threshold of 3 seconds is described above, other angles and time thresholds are possible depending on the specific implementation as understood by one of ordinary skill in the art. Similarly, in the example embodiment above, polling by the secondary controller 229 occurs every 10 ms, but other polling schedules including non-periodic schedules are possible as understood by one of ordinary skill in the art.

Through the combined use of one or more accelerometers 275 and one or more gyroscopes 276, the switches 170 as described with respect to the embodiment of FIG. 2 may be omitted. Replacing the switches 170 with the accelerometers 275 and the gyroscopes 276 for counting the number of rotations of the drum 110 may reduce or eliminate the occurrence of false (or ghost) rotations counted by the switches 170 of the prior embodiment. Moreover, the use of the accelerometers 275 and the gyroscopes 276 makes it easier to detect the sense of rotation (clockwise versus counterclockwise) of these rotations.

In some instances, the use of mechanical tilts such as the switches 170 of FIG. 2 for spin counting considers a given sequence of openings and closures of the tilts to increment the spin counting. As it is mechanical, this method can be subject to the detection of false (or ghost) spins, for example in the situation of shakes. The use of the accelerometers 275 and the gyroscopes 276 for spin counting can reduce or eliminate this potential issue. Moreover, the use of the accelerometers 275 and the gyroscopes 276 also allows counting of the rotations that occur on the axis of revolution perpendicular to the ground. Mechanical tilt counting processing can only detect rotations that occur on the axis of revolution parallel to the ground.

The sensing device 228 optionally further includes one or more shock sensors 271, 272 configured for detecting shocks of the drum 210. The secondary controller 229 is associated with the accelerometer 275, the gyroscope 276, and the (optional) shock sensors 271, 272. The secondary controller 229 is configured for determining the severity of the shocks of the drum 210 using the values from the shock sensors 271, 272 and for counting the number of rotations of the drum 210. The shock sensors 271, 272 generate another interrupt signal sent to secondary controller 229 when acceleration higher than a threshold is detected. At interrupt reception, the secondary controller 229 computes the signal and stores its intensity into the local memory 221. Such stored information is formatted into an array composed by intensity and timing of the shocks.

The one or more shock sensors 271, 272 can be configured for verifying whether the drum 210 is rotating around its longitudinal axis (Y). In this case, the counting of the number of rotations of the drum 210 starts if the one or more shock sensors 271, 272 verify that the drum 210 is rotating around its longitudinal axis (Y).

In alternative embodiments, the shock sensors may be not used and instead the accelerometer 275 is used as the shock sensor. For example, the accelerometer may be further programmed to detect accelerations higher than a predetermined threshold, for example, four times the gravity (4 g). When the accelerometer measures higher than 4 g, an interrupt signal is provided to the secondary controller 229 that causes an identification of a shock event.

The shock sensors 271, 272 can comprise a gyroscope, or a biaxial/triaxial accelerometer and a gyroscope, or a couple of biaxial/triaxial accelerometers.

In this description, the biaxial accelerometer may be an accelerometer capable of detecting displacements along the two axes orthogonal to the longitudinal axis Y.

As it is known a biaxial accelerometer can be replaced by a pair of uniaxial accelerometers, as well as a triaxial accelerometer can be replaced by three uniaxial accelerometers. Moreover, a gyroscope can be replaced by two biaxial/triaxial accelerometers.

In the particular embodiment illustrated in FIG. 5, the sensing device 228 of the tracker device 220 includes the accelerometer 275, the gyroscope 276, and the optional shock sensor 271 arranged on the flange 212 of the cable drum 210. The accelerometer 275, the gyroscope 276, and the shock sensor 271 may be positioned in any manner on the drum 210.

In other embodiments, multiple accelerometers 275 and/or multiple gyroscopes 276 are provided. The use of more than one accelerometer 275 and/or more than one gyroscope 276 can improve the computation of signals such as the angular speed when the tracking device 220 is fixed on a drum 210 having an axis of revolution that is not parallel to the ground.

In this case, the secondary controller 229 is configured for verifying whether the drum 210 rotates constantly around its longitudinal axis Y at a rotation speed higher than a minimum value, for example one revolution every 30 seconds. In case of a positive outcome of this verification the secondary controller 229 exploits the counting of the number of rotations of the drum 210 around its longitudinal axis.

In this way, it is possible to avoid the counting of the number of rotations in the situations that are far from regular operation conditions, thus saving electrical power.

If the drum 210 is not rotating constantly it more likely means that it is being pulled, pushed, or loaded to or from transportation equipment, and this scenario is far from regular operations. The sensing device 228 optionally is configured to detect also environmental parameters like, for example, temperature, humidity, and atmospheric pressure. In this case the sensing device 228 comprises also a temperature sensor and/or a humidity sensor and/or a barometer for measuring the atmospheric pressure.

The communication circuit 225 comprises wireless transceivers adapted to transmit data signals on a wireless communication system, like for example a GSM/GPRS network or a Narrowband network or a Bluetooth link.

The communication circuit 225 provides multiple communication technology options. By implementing multiple communication technologies within the communication circuit 225, it is possible to increase the transmission success rate even in areas where a specific technology is not present or is currently unavailable.

A list of communication technologies to be tried for a communication session is compiled within the communication module and can be varied dynamically according to the operating logics. Such technologies include, but are not limited to, GSM (Global System for Mobile communications), LTE (long-term evolution), and NB-IoT (Narrowband Internet of Things). Because a specific technology may be provided in a given area by some carriers, but not others, or may not be available at all, having the capability to communicate through other technologies that are available increases the chances of establishing a successful communication session even where a specific technology is not available in that area.

The logic of operation and determination of the communication technology to be used can be varied according to several conditions, for example, by varying the telco providers order (or the technology) to be used in a specific area (known through GPS coordinates, for example). Such a process may increase the transmission success rate without negatively affecting the power consumption.

The positioning circuit 226 comprises a satellite positioning circuit such as GPS, Glonass, Beidou or Galileo adapted for receiving position coordinates at scheduled times optionally controlled by the main controller 227.

Optionally, the tracker device 220 comprises a sensor adapted to activate the tracker device 220 when it is attached to the drum 210. This sensor can be a magnetic switch adapted to activate the tracker device 220 when it is aligned with magnets positioned on the drum 210 at the correct mounting position of the tracker device 220.

Alternatively, this sensor can be a near-field communication (NFC) switch device associated with the tracker device 220 and configured for activating/deactivating the tracker device 220 when it receives a control signal. This control signal can be sent by a terminal, like for example, a smartphone.

The database 230 can be a cloud memory with which it is possible to communicate in a wireless manner.

To ensure sufficient strength and durability, the circuits of the tracker device 220 are sprayed with a special resin that does not interfere with the electronic operation of the circuits and does not induce any magnetic field for the operation of radio transmissions.

The positioning circuit 226, in particular, is configured to detect the position coordinates of the tracker device 220 and of the drum 210 by means of a satellite positioning circuit such as GPS, Glonass, Beidou or Galileo or by means of data retrieved by the communication circuit 225 from the communication system 260 or other networks like for example a Low Earth Orbit network.

In the absence of a satellite signal, the position coordinates may be obtained through the GSM module by triangulating or trilaterating calculations performed by the processor 240.

If it is not possible to determine the position of the tracker device 220, the processor 240 can indicate the partial reliability of the received data.

After that, the tracker identifier, the detected position coordinates and the detected events stored in the local memory 221 are transmitted to the database 230 via the communication system 260. The transmission is exploited through the communication circuit 225.

Optionally, after the transmission at least part of the local memory 221 is cleaned. In particular, all previous stored information except the last one and the data just sent are removed.

In any case, the activating of the second electronic circuit 224 and the subsequent steps occur at pre-set intervals controlled by the main controller 227.

Optionally, the activating of the second electronic circuit 224 and the subsequent steps occur when the tracker device 220 has been attached to the drum 210. This may be obtained by providing the tracker device 220 with the magnetic switch or with the near-field communication (NFC) switch device previously described.

According to another further option, the activating of the second electronic circuit 224 and the subsequent steps occur when a request of synchronization signal is received by the communication circuit 225.

In this case, the request of synchronization signal may be sent by the processor 140 following a command of a user. In this way, it is possible to retrieve data at any time.

After the transmitting step the second electronic circuit 224 is switched to standby mode by the main controller 227. The switching to standby mode after the transmission occurs regardless of the output of the transmission, which guarantees preventive battery degradation and offers the opportunity to develop a database side alert logic.

The main controller 227 can have an internal clock which performs a countdown of given time corresponding to the scheduled time interval.

In this case, when the first electronic circuit 222 of the tracker device 220 is activated, the event detected by the sensing device 228 is stored in the local memory 221 with the countdown value corresponding to the time of the activation of said first electronic circuit 222. In this way, it is possible to calculate the time at which each stored event occurred.

Optionally, before the second electronic circuit 224 is switched to standby mode the method for tracking drums according to embodiments of the present disclosure provides the steps of checking whether new configuration data are available in the database. In case of a positive outcome of this verification, the method provides for downloading the new configuration data and applying the new configuration to the tracker device electronic circuits.

In fact, the communications between the tracker device and the database can be bidirectional so it is possible to manage and adjust the tracker device settings (firmware, frequency, schedule of the transmission and so on).

The transmitted data are then associated to the tracker identifier and the drum identifier in the database 230.

Then, the processor 240 calculates using the data stored in the database 230 the remaining length of the material 250 on the drum 210.

In particular, the data detected from the sensing device 228 are required to calculate the amount of material 250 still present on the drum 210. This processing requires also that the drum dimensions (core diameter, inner drum width) and material dimensions (diameter, length) are known.

The calculated remaining length of the material 250 can then be stored in the database 230 associated with the tracker identifier and the drum identifier.

The system and the method for tracking drums according to embodiments of the present disclosure has many advantages.

The database 230 and the processor 240 can be part of a Web portal or Web Platform capable of collecting and processing all the information found on the territory ensuring sufficient flexibility in terms of evolution and delivery of the service. In this case, the processor 240 can be provided with a software capable of: searching and locating a single drum through geographic view; defining alarms based on the position of the drum in relation to defined geographic areas (Geofencing) and/or based on the time in a specific location, especially in a configuration where the transmission frequency is increased; providing historical traceability of each drum and/or about material amount based on detected positions; generating a report for drum flow and stock in the territory; and integrating with external services (i.e. Shipping Providers).

By managing location information and geofencing areas such as production plant and delivery address, the Web Platform can be configured to notify either through SMS or e-mail the configured distribution list for a given order (the order, drum, customer and all related information are associated to the tracker during the association phase) about the drum's status changes: Preparing, Ready, Shipping, Delivered.

The Web Platform has the dual function to collect data from each deployed tracker device 220 and managing their settings from remote.

In fact, the Web Platform can send remote commands and even reprogram the tracker devices 220 firmware remotely.

The Web Platform can also be configured to aggregate data from the field (from the trackers) with data coming from production systems such as MES, SAP, etc. through API, EDI or similar integration.

By knowing the amount of material left on each drum it is possible to manage and generate alerts or notifications about stock running low, and propose actions such as order reissue or other customer relationship activities.

What is claimed is:

1. A method of tracking rotations of a drum, the method comprising:
    activating a three axis accelerometer located on a side of the drum while keeping a gyroscope deactivated;
    measuring linear accelerations along three orthogonal axes using the accelerometer;
    determining whether a predetermined angle of the drum has been rotated based on the measured linear accelerations from the accelerometer;
    activating the gyroscope in response to determining that the predetermined angle of the drum has been rotated so that the gyroscope is activated based on the measured linear accelerations from the accelerometer;
    measuring angular speed of the drum around a main axis of the drum with the gyroscope;
    calculating a number of rotations of the drum from the angular speed of the drum as measured by the gyroscope; and
    deactivating the gyroscope in response to determining that the angular speed measured by the gyroscope is lower than a noise floor level for angular speed of the drum.

2. The method for tracking drums according to claim 1, wherein the three axis accelerometer is configured to detect shocks above a predetermined threshold force value.

3. A method of tracking rotations of a drum, the method comprising:
- activating a three axis accelerometer located on a side of the drum while keeping a gyroscope deactivated;
- measuring linear accelerations along three orthogonal axes using the accelerometer;
- determining whether a predetermined angle of the drum has been rotated based on the measured linear accelerations from the accelerometer;
- activating the gyroscope in response to determining that the predetermined angle of the drum has been rotated so that the gyroscope is activated based on the measured linear accelerations from the accelerometer;
- measuring angular speed of the drum around a main axis of the drum with the gyroscope;
- calculating a number of rotations of the drum from the angular speed of the drum as measured by the gyroscope; and
- deactivating the gyroscope in response to determining that the angular speed measured by the gyroscope is lower than a noise floor level for angular speed of the drum;
- attaching a tracker device with a tracker identifier to a drum with a drum identifier, the drum identifier being associated in a database with drum dimensions and with dimensions of a material stored on the drum, tracker device comprising the three axis accelerometer and the gyroscope;
- associating in the database the drum identifier with the tracker identifier;
- storing the number of rotations in a local memory of the tracker device;
- activating an electronic circuit comprising a communication circuit that connects to a wireless communication system and a positioning circuit that detects the position coordinates of the tracker device and the drum;
- transmitting, to the database via the communication system, the tracker identifier, the detected position coordinates and the number of rotations;
- switching the electronic circuit to a standby mode after the transmitting;
- associating the detected position coordinates and the number of rotations to the tracker identifier and the drum identifier in the database; and
- calculating, using the drum dimensions and the dimensions of the material stored in the database, a remaining length of the material stored on the drum, wherein the activating, the associating, and the calculating occur at scheduled time intervals.

4. The method for tracking drums according to claim 3, further comprising cleaning a part of the local memory after transmitting the tracker identifier, the detected position coordinates and the number of rotations.

5. The method for tracking drums according to claim 3, wherein the positioning circuit detects the position coordinates of the tracker device and the drum using a satellite positioning circuit or from data retrieved from the communication system by the communication circuit.

6. The method for tracking drums according to claim 3, wherein, before switching the electronic circuit to the standby mode, the method further comprises:
- checking whether new configuration data are available in the database;
- when the new configuration data are available, downloading the new configuration data; and
- applying the new configuration to the tracker device.

7. The method for tracking drums according to claim 3, wherein the activating, the associating, and the calculating each occur when the tracker device is attached to the drum.

8. The method for tracking drums according to claim 3, wherein the activating, the associating, and the calculating each occur in response to a control signal received by the communication circuit.

9. The method for tracking drums according to claim 3, wherein the activating, the associating, and the calculating occur in response to a control signal received by a near-field communication (NFC) switch device associated to the tracker device and configured for activating/deactivating the tracker device.

10. The method for tracking drums according to claim 3, wherein the tracking device further comprises a shock sensor configured for detecting shocks of the drum, the shock sensor being separate from the three axis accelerometer.

11. The method for tracking drums according to claim 3, wherein the material stored on the drum comprises a telecommunication cable, an energy cable, a hybrid cable, a film, a paper tape, or a wire.

12. The method for tracking drums according to claim 3, wherein the communication circuit includes a list of communication technologies, and wherein the communication circuit connects to the wireless communication system using one of the communication technologies as determined by a logic operation.

13. The method for tracking drums according to claim 12, wherein the logic operation determines the one of the communication technologies to be used by the communication circuit according to a location of the drum.

14. The method for tracking drums according to claim 12, wherein the list of communication technologies is varied dynamically.

15. The method for tracking drums according to claim 3, wherein the tracker device comprises a main controller that has an internal clock which performs a countdown of given time corresponding to the scheduled time interval.

16. A system comprising:
- a tracker device having a tracker identifier configured to be attached to a drum, the tracker device comprising
  - a three axis accelerometer located on a side of the drum and configured to measure linear accelerations along three orthogonal axes,
  - a gyroscope, and
  - one or more controllers configured to
    - activate the three axis accelerometer to measure the linear accelerations while keeping the gyroscope deactivated,
    - determine whether a predetermined angle of the drum has been rotated based on the measured linear accelerations from the accelerometer,
    - activate the gyroscope in response to determining that the predetermined angle of the drum has been rotated so that the gyroscope is activated based on the measured linear accelerations from the accelerometer,
    - measure angular speed of the drum around a main axis of the drum with the gyroscope,
    - calculate a number of rotations of the drum from the angular speed of the drum as measured by the gyroscope, and
    - deactivate the gyroscope in response to determining that the angular speed measured by the gyroscope is lower than a noise floor level for angular speed of the drum.

17. The system of claim 16, wherein the tracking device is configured to detect shocks when the measured linear accelerations is above a predetermined threshold force value.

18. The system of claim 16, further comprising:
a drum having a drum identifier and attached to the drum; and
the tracker device further comprising:
  electronic circuit comprising a communication circuit configured to connect to a wireless communication system and a positioning circuit configured to detect the position coordinates of the tracker device and the drum,
  a local memory for storing the tracker identifier,
  a database configured to communicate with the tracker device, the drum identifier being associated in the database with drum dimensions and with dimensions of a material stored on the drum, the drum identifier being associated with the tracker identifier in the database,
  a main controller configured to
    store the number of rotations in a local memory of the tracker device;
    activate an electronic circuit comprising a communication circuit that connects to a wireless communication system and a positioning circuit that detects the position coordinates of the tracker device and the drum;
    transmit, to the database via the communication system, the tracker identifier, the detected position coordinates and the number of rotations;
    switch the electronic circuit to a standby mode after the transmitting;
  the database configured to associate the detected position coordinates and the number of rotations to the tracker identifier and the drum identifier in the database; and
  a processor associated to the database, wherein the processor when executed with instructions is configured to calculate, using the drum dimensions and the dimensions of the material stored in the database, a remaining length of the material stored on the drum at a predetermined time interval.

19. The system of claim 18, wherein the tracking device further comprises a shock sensor configured for detecting shocks of the drum.

20. The system of claim 18, wherein the electronic circuit includes a list of communication technologies, and wherein the communication circuit is configured to connect to a wireless communication system using one of the communication technologies as determined by a logic operation, wherein the logic operation is configured to determine the communication technology to be used by the communication circuit according to a location of the drum.

* * * * *